United States Patent
Shpiner et al.

(10) Patent No.: US 10,630,590 B2
(45) Date of Patent: Apr. 21, 2020

(54) CREDIT LOOP DEADLOCK DETECTION AND RECOVERY IN ARBITRARY TOPOLOGY NETWORKS

(71) Applicant: MELLANOX TECHNOLOGIES TLV LTD., Raanana (IL)

(72) Inventors: Alexander Shpiner, Nesher (IL); Eitan Zahavi, Zichron Yaakov (IL); Vladimir Zdornov, Kfar Saba (IL); Tal Anker, Ramat Gan (IL); Matty Kadosh, Hadera (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 61 days.

(21) Appl. No.: 15/626,135

(22) Filed: Jun. 18, 2017

(65) Prior Publication Data

US 2018/0019947 A1    Jan. 18, 2018

Related U.S. Application Data

(60) Provisional application No. 62/362,072, filed on Jul. 14, 2016.

(51) Int. Cl.
| | |
|---|---|
| *H04L 12/801* | (2013.01) |
| *H04L 12/863* | (2013.01) |
| *H04L 12/707* | (2013.01) |
| *H04L 12/873* | (2013.01) |

(52) U.S. Cl.
CPC ............. *H04L 47/10* (2013.01); *H04L 45/22* (2013.01); *H04L 47/627* (2013.01); *H04L 47/39* (2013.01); *H04L 47/524* (2013.01)

(58) Field of Classification Search
CPC ........ H04L 45/18; H04L 45/22; H04L 47/627
See application file for complete search history.

(56) References Cited

U.S. PATENT DOCUMENTS

| | | | |
|---|---|---|---|
| 2002/0049901 A1* | 4/2002 | Carvey | H04L 49/251 713/153 |
| 2003/0016624 A1* | 1/2003 | Bare | H04L 29/12009 370/217 |
| 2003/0016628 A1* | 1/2003 | Kadambi | H04L 12/4641 370/235 |

(Continued)

OTHER PUBLICATIONS

Anjan et al., "An efficient, fully adaptive deadlock recovery scheme: DISHA", Proceedings of the 22nd Annual International Symposium on Computer Architecture (ISCA '95), pp. 201-210, Santa Margherita, Jun. 22-24, 1995.

(Continued)

*Primary Examiner* — Jael M Ulysse
(74) *Attorney, Agent, or Firm* — Kligler & Associates

(57) ABSTRACT

A credit loop that produces a deadlock is identified in a network of switches that are interconnected for packet traffic flows therethrough. The identification is carried out by periodically transmitting respective credit loop control messages from the loop-participating switches via their deadlock-suspected egress ports to respective next-hop switches. The CLCMs has switch port-unique identifiers (SPUIDs). The loop is identified when in one of the next-hop switches the SPUID of a received CLCM is equal to the SPUID of a transmitted CLCM thereof. A master switch is selected for resolving the deadlock.

19 Claims, 11 Drawing Sheets

(56) References Cited

U.S. PATENT DOCUMENTS

| | | | | |
|---|---|---|---|---|
| 2003/0043756 A1* | 3/2003 | Reynders | | H04L 45/12 370/254 |
| 2003/0142627 A1* | 7/2003 | Chiu | | H04L 45/00 370/238 |
| 2003/0165119 A1* | 9/2003 | Hsu | | H04L 12/437 370/258 |
| 2003/0179742 A1* | 9/2003 | Ogier | | H04L 1/1614 370/351 |
| 2003/0195983 A1* | 10/2003 | Krause | | H04L 47/12 709/238 |
| 2004/0085972 A1* | 5/2004 | Warren | | H04L 12/433 370/401 |
| 2004/0085994 A1* | 5/2004 | Warren | | H04L 12/433 370/462 |
| 2005/0108444 A1* | 5/2005 | Flauaus | | H04L 41/0853 710/15 |
| 2005/0174942 A1* | 8/2005 | Betker | | H04L 47/10 370/235 |
| 2006/0092832 A1* | 5/2006 | Santoso | | H04L 45/00 370/218 |
| 2006/0104298 A1* | 5/2006 | McAlpine | | H04L 47/10 370/412 |
| 2006/0245351 A1* | 11/2006 | Pande | | H04L 12/1868 370/216 |
| 2007/0104096 A1* | 5/2007 | Ribera | | H04L 12/1881 370/229 |
| 2007/0242602 A1* | 10/2007 | Pang | | H04L 12/462 370/216 |
| 2007/0280102 A1* | 12/2007 | Vasseur | | H04J 3/14 370/225 |
| 2008/0259798 A1* | 10/2008 | Loh | | H04L 45/302 370/235 |
| 2009/0245242 A1* | 10/2009 | Carlson | | H04L 12/413 370/386 |
| 2009/0252030 A1* | 10/2009 | Kashyap | | H04L 12/437 370/216 |
| 2009/0274054 A1* | 11/2009 | Wakumoto | | H04L 12/462 370/242 |
| 2010/0257400 A1* | 10/2010 | Whitby-Strevens | | H04L 41/0681 714/4.11 |
| 2012/0014253 A1* | 1/2012 | Rongong | | H04L 49/35 370/235 |
| 2012/0044940 A1* | 2/2012 | Katz | | H04L 12/462 370/400 |
| 2012/0243442 A1* | 9/2012 | Musku | | H04L 12/4625 370/256 |
| 2013/0114620 A1* | 5/2013 | Bogdanski | | H04L 45/48 370/408 |
| 2013/0121154 A1* | 5/2013 | Guay | | H04L 45/125 370/236 |
| 2013/0163596 A1* | 6/2013 | Zhang | | H04L 45/18 370/392 |
| 2013/0301403 A1* | 11/2013 | Esale | | H04L 45/16 370/221 |
| 2013/0311673 A1* | 11/2013 | Karthikeyan | | H04L 41/147 709/239 |
| 2014/0098711 A1* | 4/2014 | Thubert | | H04L 45/128 370/255 |
| 2014/0119193 A1* | 5/2014 | Anand | | H04L 45/28 370/237 |
| 2014/0204735 A1* | 7/2014 | Kumar | | H04L 47/12 370/229 |
| 2014/0254592 A1* | 9/2014 | Olofsson | | H04L 12/1863 370/390 |
| 2015/0003247 A1* | 1/2015 | Mejia | | H04L 47/12 370/235 |
| 2015/0016257 A1* | 1/2015 | Kumar | | H04L 47/16 370/235 |
| 2015/0103674 A1* | 4/2015 | Ramesh | | H04L 41/12 370/244 |
| 2015/0180790 A1* | 6/2015 | Rimmer | | H04L 47/39 370/368 |
| 2015/0188817 A1* | 7/2015 | Parker | | G06F 15/17362 709/238 |
| 2016/0072694 A1* | 3/2016 | St-Laurent | | H04L 43/50 370/249 |
| 2016/0154756 A1* | 6/2016 | Dodson | | G06F 13/4022 710/316 |

OTHER PUBLICATIONS

Dally et al., "Deadlock free message routing in multiprocessor interconnection networks", Computer Science Technical Reports, deadlock-Free Message Routing in Multiprocessor Interconnection Networks, California Institute of Technology, 16 pages, May 10, 1985.

Toueg et al., "Some Complexity Results in the Design of Deadlock-Free Packet Switching Networks", SIAM Journal on Computing, vol. 10, No. 4, pp. 702-712, Nov. 1981.

Domke et al., "Deadlock-Free Oblivious Routing for Arbitrary Topologies", 2011 IEEE International Parallel & Distributed Processing Symposium (IPDPS), 12 pages, May 16-20, 2011.

Duato., "A New Theory of Deadlock-Free Adaptive Routing in Wormhole Networks", IEEE Transactions on Parallel and Distributed Systems, vol. 4, No. 12, pp. 1320-1331, Dec. 1993.

Forster et al., "Consistent Updates in Software Defined Networks: On Dependencies, Loop Freedom, and Blackholes", 15th International IFIP TC6 Networking Conference, 9 pages, Vienna, Austria, May 17-19, 2016.

Glass et al., "The Turn Model for Adaptive Routing", Proceedings of the 19th Annual International Symposium on Computer Architecture, pp. 278-287, May 19-21, 1992.

InfiniBand TM Architecture Specification, vol. 1, 1727 pages, Release 1.2.1, Nov. 2007.

Lopez et al., "A Very Efficient Distributed Deadlock Detection Mechanism for Wormhole Networks", Proceedings of the 4th International Symposium on High-Performance Computer Architecture, 10 pages, Feb. 1-4, 1998.

Liu et al., "F10: A Fault-Tolerant Engineered Network", 10th USENIX Symposium on Networked Systems Design and Implementation (NSDI '13), pp. 399-412, Apr. 2-5, 2013.

Lysne et al., "Layered Routing in Irregular Networks", IEEE Transactions on Parallel and Distributed Systems, vol. 17, No. 1, pp. 51-65, Jan. 2006.

Park et al., "Generic Methodologies for Deadlock-Free Routing", Proceedings of the 10th International Parallel Processing Symposium (IPPS '96), 6 pages, Apr. 15-19, 1996.

Puente et a., "Adaptive Bubble Router: a Design to Improve Performance in Torus Networks", Proceedings of the International Conference on Parallel Processing, 10 pages, Sep. 24, 1999.

Schroeder et al., "Autonet: A High-speed, Self-Configuring Local Area Network Using Point-to-Point Links", IEEE Journal on Selected Areas in Communications, vol. 9, No. 8, pp. 1318-1334, Oct. 1991.

Underwood et al., "A Unified Algorithm for both Randomized Deterministic and Adaptive Routing in Torus Networks", IEEE International Parallel & Distributed Processing Symposium, pp. 723-732, year 2011.

Zats et al., "DeTail: Reducing the Flow Completion Time Tail in Datacenter Networks", Electrical Engineering and Computer Sciences, University of California at Berkeley, Technical Report No. UCB/EECS-2011-113, 18 pages, Oct. 19, 2011.

Pinkston et al., "Deadlock Characterization and Resolution in Interconnection Networks", Chapter 13, pp. 445-491 (book Deadlock Resolution in Computer-Integrated Systems by Zhou et al.), CRC Press, year 2004.

Song et al., "A New Mechanism for Congestion and Deadlock Resolution", Proceedings of the International Conference on Parallel Processing (ICPP'02), pp. 1-10, Aug. 21-22, 2002.

* cited by examiner

CREDIT LOOP DEADLOCK DETECTION AND RECOVERY IN ARBITRARY TOPOLOGY NETWORKS

CROSS-REFERENCE TO RELATED APPLICATIONS

This application claims the benefit of U.S. Provisional Application No. 62/362,072, filed 14 Jul. 2016, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to data switching networks. More particularly, this invention relates to congestion avoidance and recovery in data switching networks.

2. Description of the Related Art

The meanings of certain acronyms and abbreviations used herein are given in Table 1.

TABLE 1

Acronyms and Abbreviations

| | |
|---|---|
| CEE | Converged Enhanced Ethernet |
| CLCM | Credit Loop Control Message |
| CPU | Central Processing Unit |
| ECMP | Equal Cost Multi-Path Routing |
| FCoE | Fiber Channel Over Ethernet |
| HLL | Head-of-queue Lifetime Limit |
| MTU | Maximum Transmission Unit |
| RDMA | Remote Direct Memory Access |
| SDK | Software Development Kit |
| SDN | Software Defined Networks |
| SPUID | Switch Port-Unique Identifier |
| SRAM | Static Random Access Memory |

Lossless networks are a recent trend in data center networking. Lossless networks provide multiple performance advantages to data center applications. Recently emerging Converged Enhanced Ethernet (CEE) data center networks rely on layer-2 flow control in order to support packet loss-sensitive transport protocols, such as RDMA and FCoE. Even with reliable transport protocols, such as TCP, dropping packets results in bandwidth decrease, significant completion time increase and statistical tail, especially with short-lived flows.

Although lossless networks can improve end-to-end network performance, without careful design and operation, they can suffer from in-network deadlocks, caused by cyclic buffer dependencies. These dependencies are called credit loops and occur in schemes such as InfiniBand, which use a credit-based flow control scheme in hardware. In such schemes a "credit" is transferred by an egress node to an ingress node in a network or fabric. The credit confers a right upon the ingress node to consume a specified portion of the memory of the egress node. Thus, an egress port can only send packets if it has a credit at the destination ingress port.

Given a topology and routing rules, a credit loop is defined as a cyclic sequence of switch buffers, such that every switch in the sequence sends traffic to the next switch in the sequence. This sequence is dependent on the existence of at least one routing rule, wherein a switch forwards packets arriving via a link in the sequence to the next link in the sequence. A credit loop deadlock occurs when all the switch buffers on the sequence become full and no traffic can be propagated.

Credit loops are a silent killer; they may exist for a long time, but deadlocks only with specific traffic patterns. Although existing credit loops rarely deadlock, when they do they can block large parts of the network. Naïve solutions recover from credit loop deadlock by draining buffers and dropping packets. Previous works have suggested credit loop avoidance by central routing algorithms, but these assume specific topologies and are slow to react to failures.

Several methods have been proposed to deal with credit loop deadlocks. Some of these methods consider the loops when defining the forwarding rules. The most common of which is the Up*/Down* algorithm that works well with any treelike topology. According to this algorithm, credit loops are prevented if the forwarding from downstream link to upstream link is prohibited.

Another set of solutions rely on multiple sets of buffers, like Ethernet traffic classes or priorities, and break the loops by changing the buffer pools used by the packets as they overlap with the start of the cycle. However, these methods are all based on a central controller to calculate the forwarding rules that avoid credit loops and thus are slow to respond to failures and work only in SDN-like environments.

As a measure of last resort for dealing with credit loop deadlock, the InfiniBand specification defines a Head-of-queue Lifetime Limit (HLL) mechanism. This mechanism allows switches to drop packets that are waiting in the head of the switch queue for a significant amount of time.

SUMMARY OF THE INVENTION

According to disclosed embodiments of the invention, algorithms are provided to detect and correct impaired traffic progress through a data switching network, including recovery from credit loop deadlock for arbitrary network topologies and routing protocols. The algorithms can be implemented in commodity switch hardware. They require negligible additional control bandwidth, and avoid packet loss after a deadlock occurs.

The detection algorithm makes no assumptions about the routing algorithm in use.

Two deadlock resolution algorithms are provided. One of them, called "Loop Breaker", solves the credit loop by rerouting flows. It assumes the existence of multiple paths between hosts in the network. The second algorithm, called "Deadlock Breaker", given a detected loop, guarantees traffic forward progress even without multiple paths between hosts.

There is provided according to embodiments of the invention a method of communication, which is carried out in a network of switches that are interconnected for packet traffic flows therethrough by identifying a credit loop that produces a deadlock, the credit loop including loop-participating switches having respective deadlock-suspected egress ports. The identification is carried out by periodically transmitting respective credit loop control messages (CLCMs) from the loop-participating switches via the deadlock-suspected egress ports to respective next-hop switches. The CLCMs have switch port-unique identifiers (SPUIDs). The method is further carried out by determining in one of the next-hop switches that the SPUID of a current received CLCM is equal to the SPUID of a transmitted CLCM thereof, and thereafter selecting a master switch for resolving the deadlock.

Yet another aspect of the method includes making a determination in one of the next-hop switches that the SPUID of a currently received CLCM exceeds the SPUID of a previously transmitted CLCM from that next-hop switch, and responsively to the determination continuing to periodically transmit CLCMs to a subsequent next-hop switch.

Still another aspect of the method includes making a determination in one of the next-hop switches that the SPUID of a currently received CLCM is less than the SPUID of a previously transmitted CLCM from that next-hop switch, and responsively to the determination transmitting a CLCM having the SPUID of the currently received CLCM to a subsequent next-hop switch.

One aspect of the method includes selecting as the master switch the one next-hop switch.

Another aspect of the method includes selecting as the master switch one of the switches that accepts therethrough a flow that enters the credit loop from outside the loop.

An additional aspect of the method includes identifying flows that traverse pairs of ingress ports and deadlock-suspected egress ports in the master switch, and rerouting the identified flows via respective alternate paths to destinations thereof, wherein the alternate paths have minimum cost metrics.

A further aspect of the method includes releasing a buffer space on the master switch by forcing transmission of packets via the deadlock-suspected egress port of the master switch. Forcing transmission may comprise overriding a credit flow control.

A further aspect of the method is carried out after selecting a master switch by periodically transmitting respective new CLCMs, determining in one of the loop-participating switches that the SPUID of a current new CLCM matches the SPUID of a previously received new CLCM, that one of the deadlock-suspected egress ports thereof is a deadlocked egress port, transmitting the current new CLCM via the deadlocked egress port through the loop-participating switches of the credit loop. The method is further carried out in the loop-participating switches by respectively identifying an ingress port and a previously traversed egress port of the current new CLCM, and permitting only packets from the identified ingress port to be transmitted through the previously traversed egress port.

Yet another aspect of the method includes increasing an available buffer size in the identified ingress port.

There is further provided according to embodiments of the invention a system of communication, including a network, and a plurality of switches in the network that are interconnected for packet traffic flows therethrough. The switches are configured for cooperatively identifying a credit loop in the network that produces a deadlock. Loop-participating switches having respective deadlock-suspected egress ports are identified by periodically transmitting respective credit loop control messages from the loop-participating switches via the deadlock-suspected egress ports to respective next-hop switches, the CLCMs having switch port-unique identifiers (SPUIDs). The switches are configured for cooperatively determining that in one of the next-hop switches the SPUID of a current received CLCM is equal to the SPUID of a transmitted CLCM thereof, and thereafter selecting a master switch for resolving the deadlock.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer pro-gram instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

System Description.

Figure 1:
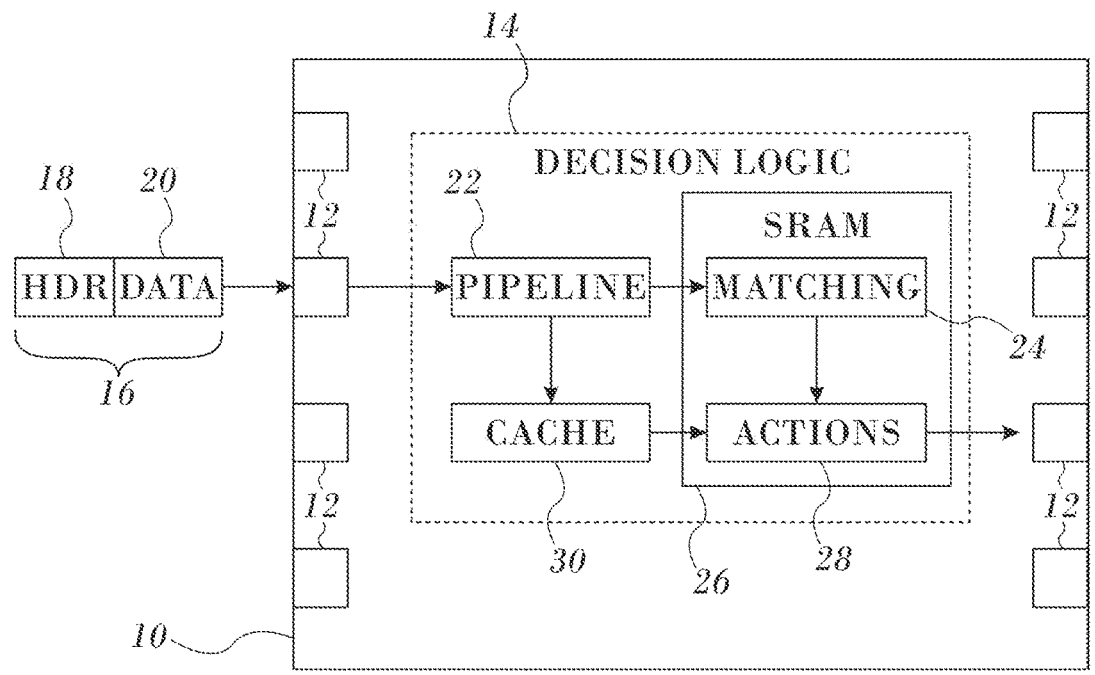
FIG. 1 is a block diagram that schematically illustrates a network element, which operates as a packet transmission apparatus in accordance with an embodiment of the invention.

Turning now to the drawings, reference is now made to FIG. 1, which is a block diagram that schematically illustrates a typical network element 10, which operates as packet transmission apparatus in accordance with an embodiment of the invention. For example, network element 10 can be configured as a network or fabric switch or a router, with multiple ports 12 connected to a packet communication network. Decision logic 14 within element 10 applies classification rules in forwarding data packets 16 between ports 12, as well as performing other actions, such as encapsulation and de-capsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 14. FIG. 1 is exemplary and not limiting, Other circuitry that can be used to perform the functions described below will occur to those skilled in the art.

In the pictured embodiment, decision logic 14 receives packets 16, each containing a header 18 and payload data 20. A processing pipeline 22 in decision logic 14 extracts a classification key from each packet, typically (although not necessarily) including the contents of certain fields of header 18. For example, the key may comprise the source and destination addresses and ports and a protocol identifier. Pipeline 22 matches the key against a matching database 24 containing a set of rule entries, which is stored in an SRAM 26 in network element 10, as described in detail hereinbelow. SRAM 26 also contains a list of actions 28 to be performed when a key is found to match one of the rule entries. For this purpose, each rule entry typically contains a pointer to the particular action that decision logic 14 is to apply to packets 16 in case of a match. Pipeline 22 typically comprises dedicated or programmable hardware logic, which is configured to carry out the functions described herein.

In addition, network element 10 typically comprises a cache 30, which contains rules that have not been incorporated into the matching database 24 in SRAM 26. Cache 30 may contain, for example, rules that have recently been added to network element 10 and not yet incorporated into the data structure of matching database 24, and/or rules having rule patterns that occur with low frequency, so that their incorporation into the data structure of matching database 24 would be impractical. The entries in cache 30 likewise point to corresponding actions 28 in SRAM 26. Pipeline 22 may match the classification keys of all incoming packets 16 against both matching database 24 in SRAM 26 and cache 30. Alternatively, cache 30 may be addressed only if a given classification key does not match any of the rule entries in database 24 or if the matching rule entry indicates (based on the value of a designated flag, for example) that cache 30 should be checked, as well, for a possible match to a rule with higher priority.

Figure 2:
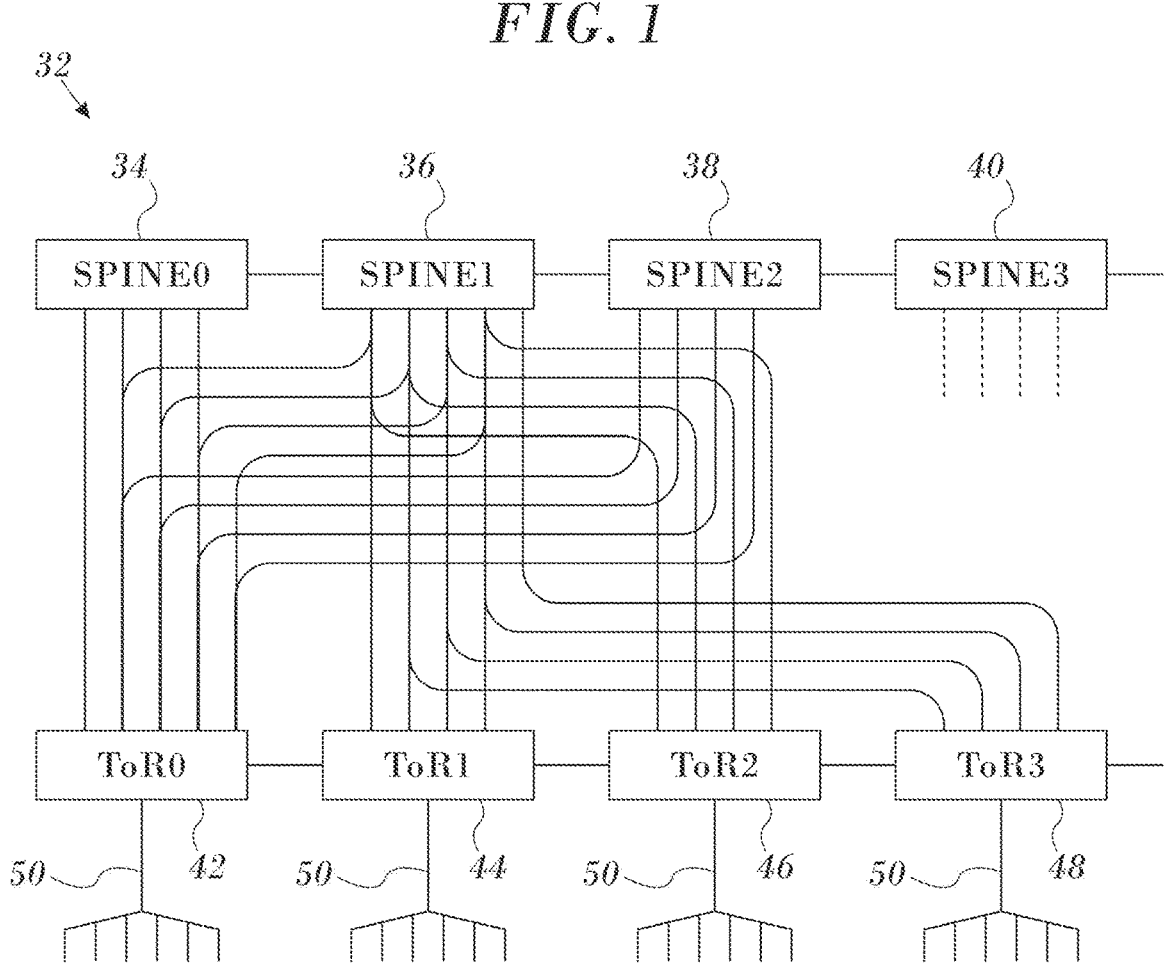
FIG. 2 is a block diagram of a portion of a fabric which is operated in accordance with an embodiment of the invention.

Reference is now made to FIG. 2, which is a detailed block diagram of a portion of a fabric 32, which is operated in accordance with an embodiment of the invention. The topology of the fabric 32 is exemplary. The principles of the invention can be applied to many network topologies, for example fat trees, rings, meshes and stars. Shown representatively are four spine nodes 34, 36, 38, 40 and four leaf nodes 42, 44, 46, 48 that interconnect with the spine nodes and which can be realized as the network element 10 (FIG. 1). Links 50 carry outflow data from the leaf nodes 42, 44, 46, 48. The leaf and spine switches are typically implemented as line cards and crossbar switches. Packet data communication within the fabric 32 is conducted by high-speed serial transmission.

Credit Loops.

Figure 3:
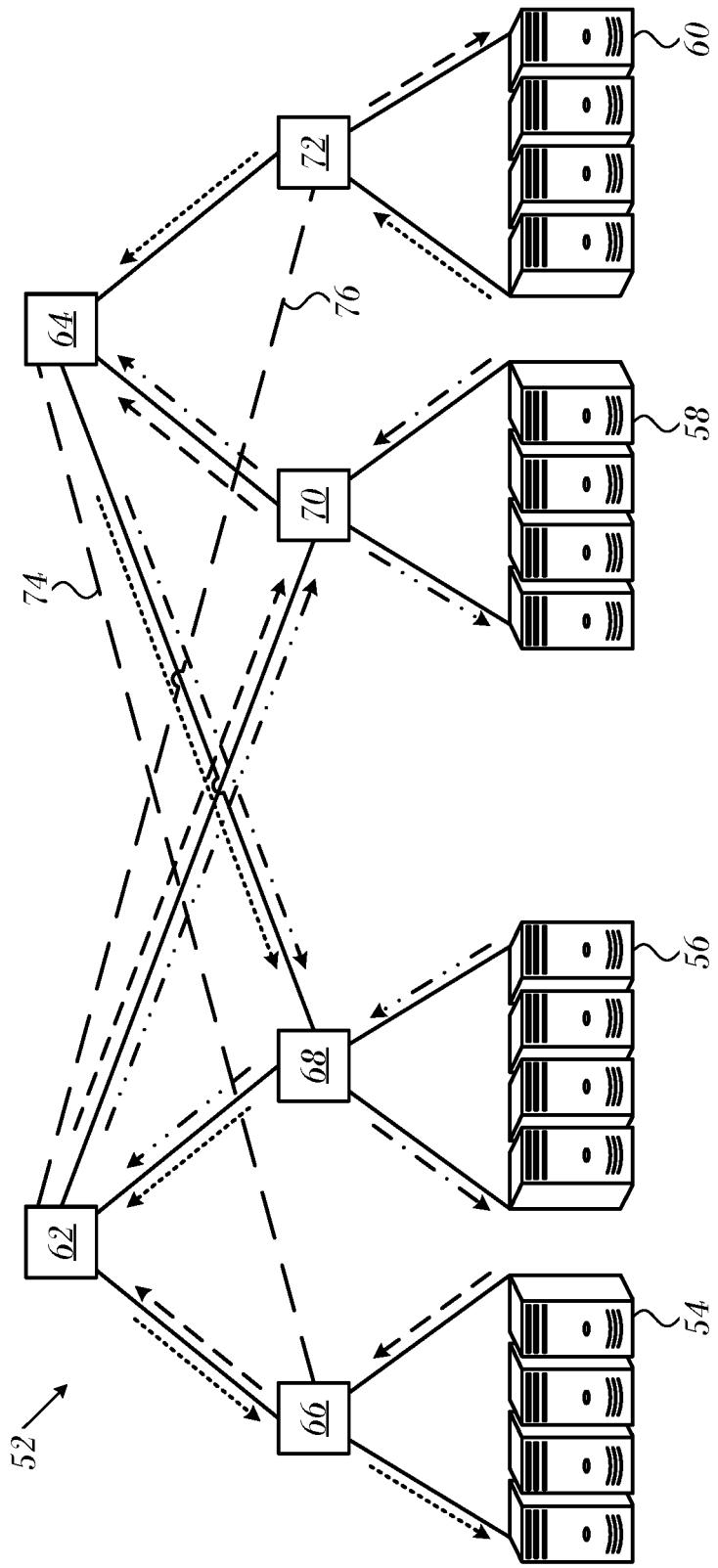
FIG. 3 is a diagram of fabric of switches illustrating a simple example of a credit loop over a network having a fat-tree topology, which is processed in accordance with an embodiment of the invention.

Reference is now made to FIG. 3, which is a diagram of a simple example of a credit loop over a network 52 having a 2-level fat tree topology, which is processed in accordance with an embodiment of the invention. Network 52 consists of four racks 54, 56, 58, 60 of servers, two core switches 62, 64 and four leaf switches 66, 68, 70, 72. Assume that link 74 between switches 64, 66 and link 76 between switch 62, 72 failed so traffic cannot be forwarded through them. The failure of these links breaks the shortest route between racks 54, 60 and forces the traffic between racks 54, 60 to flow via the two core switches 62, 64.

The example of FIG. 3 displays four flows between the racks as follows:

rack 54->rack 60;
rack 60->rack 54;
rack 56->rack 58;
rack 58->rack 56.

When the routes are forwarded as shown on FIG. 3, a credit loop is created on the switches with the following sequence:

switch 62->switch 70->switch 64->switch 68->switch 62.

Other reasons for credit loops to form, even momentarily, may arise from the complexity of SDN controller network updates. Credit loops can also occur when the topology is connected incorrectly due to human mistake.

In hyperscale data center networks, even when a central controller is used, the routing algorithm suffers a significant delay in response to link failures. To overcome this slow response and avoid packet drops, local rerouting algorithms, such as F10 were introduced. The F10 algorithm is described in the document V. Liu, D. Halperin, A. Krishnamurthy, and T. Anderson. F10: *A fault-tolerant engineered network*. In NSDI 2013, pages 399-412, 2013. In one aspect of the F10 algorithm autonomous rerouting is allowed on a link fault.

Figure 4:
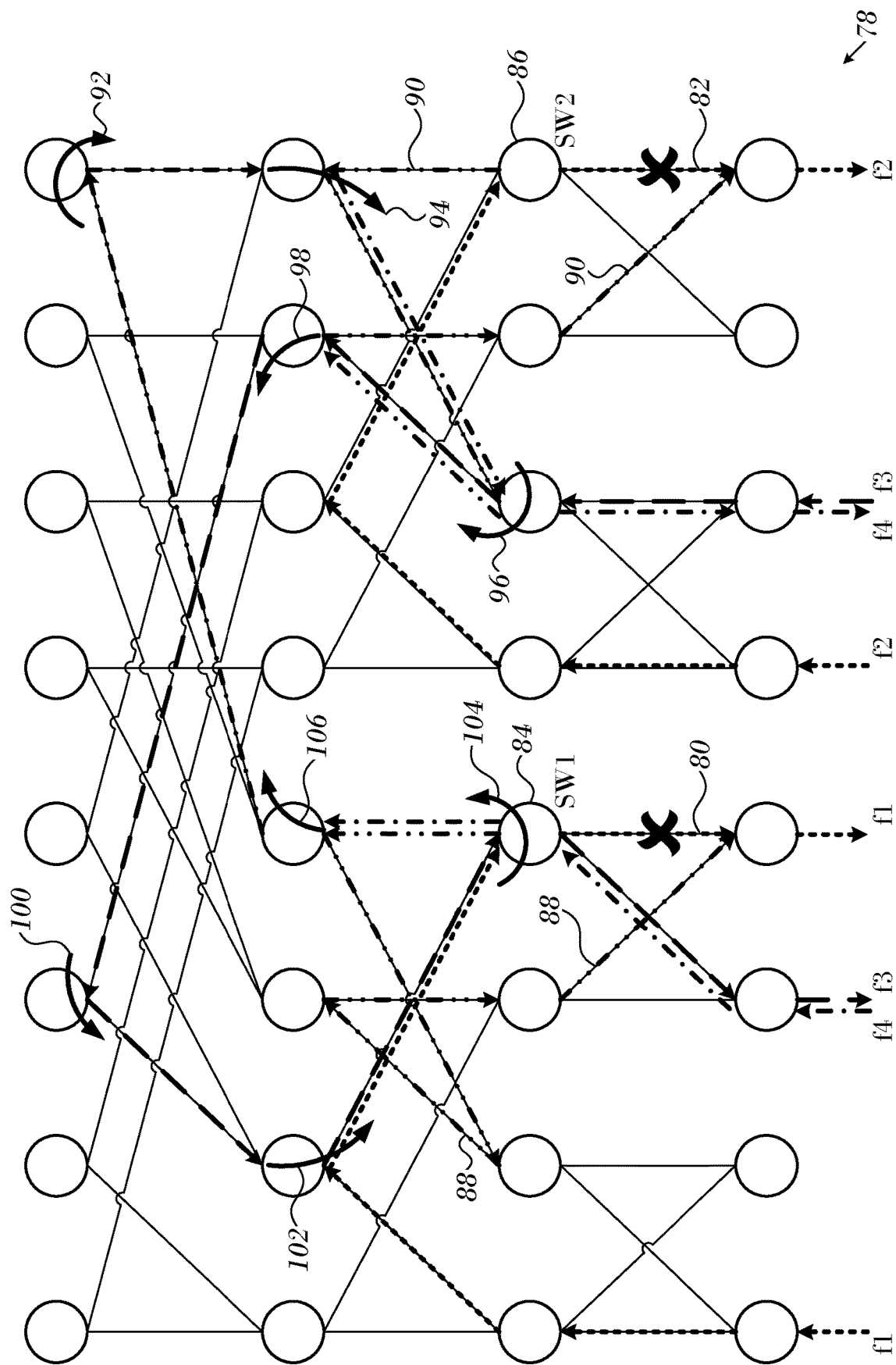
FIG. 4 is a diagram of a fabric of switches showing a credit loop caused by the F10 algorithm, which is processed in accordance with an embodiment of the invention.

However, such algorithms have a tendency to form credit loops. Reference is now made to FIG. 4, which is a diagram of a fabric 78 of switches showing a credit loop caused by the F10 algorithm. This situation can be processed in accordance with an embodiment of the invention.

Assume that links 80, 82 below switches 84, 86 (SW1, SW2) have failed. The F10 algorithm allows the switches to avoid packet drops by forwarding the incoming packets of flows f1 and f2 along solid lines 88, 90. While this provides a fast recovery, the re-routed flows f1 and f2 close a credit loop with the participating traffic from flows f3 and f4. This credit loop is depicted by a series of arrows 92, 94, 96, 98, 100, 102, 104, 106 that overlie the participating switches.

Algorithm Description.

Solutions that resolve credit loop deadlocks may need to consider the following trade-off. On one side of the spectrum of solutions, one could design an algorithm that changes the load-balancing hash functions on the entire network when credit loop deadlock is detected. That approach would minimize the chance of locking on the detected credit loop again. However, it could create new credit loops on other parts of the network and cause reordering of many flows. On the other side of the spectrum, one could have an algorithm that does not change the routes at all, but temporarily reschedules the traffic on the detected credit loop. This approach would not prevent a deadlock on the same credit loop from reoccurring.

We present two algorithms from opposite sides of this spectrum. Both algorithms rely on detecting the credit loop deadlock as a first step; however, they differ in the method of solving the deadlock. The Loop Breaker algorithm reroutes the flows to break the loop. Hence, it assumes that multipath routes exist between the hosts. After resolving the credit loop, the network will not lock on the same loop again. However, the Loop Breaker algorithm cannot guarantee completely resolving the credit loop under any condition. On the other side of the spectrum, the Deadlock Breaker algorithm guarantees forward progress on the credit loop, even after the start of a deadlock occurs. But it does not break the loop itself, and hence, does not prevent the same loop from recurring in the future.

The Loop Breaker algorithm is preferred for the persistent traffic flows, while the Deadlock Breaker algorithm is preferred for the short traffic flows.

For purposes of this disclosure, it is assumed that all the network switches support the algorithm, and are implementing conventional monitoring for detecting deadlock. Any necessary modifications to hardware can be readily made by those skilled in the art and are not discussed further herein.
Loop Breaker Algorithm.

The Loop Breaker algorithm changes routing rules in the switches in order to break the loop. It is combined from the following steps: (1) deadlock detection; (2) rerouting; and (3) traffic release.

The algorithm overcomes two major challenges. First, the switch is required to determine which pair of its ingress and egress ports are part of the credit loop sequence. Determining the egress port of the loop is trivial since it is the port that is blocked due to deadlock. However, determining which one of the ingress ports connects the credit loop is more complex.

The credit loop deadlock blocks the traffic on all the switches of the loop almost simultaneously. The desired solution performs a minimum set of routing changes. The second major challenge is the determination of a single switch, amongst the switches on the loop that can be manipulated to resolve the deadlock.
Deadlock Detection and Characterization.

All switches periodically sample their ports for a deadlock. Deadlock is determined when two conditions hold on an egress port for a significant amount of time: (1) zero throughput; and (2) non-zero queue length. Upon satisfaction of these two conditions, the port is marked as a deadlock-suspected port. The time interval depends on network latency but usually can be set in the order of hundreds of milliseconds. The chosen value provides a trade-off between reaction time to a deadlock and false determination of a deadlock.

Figure 5:
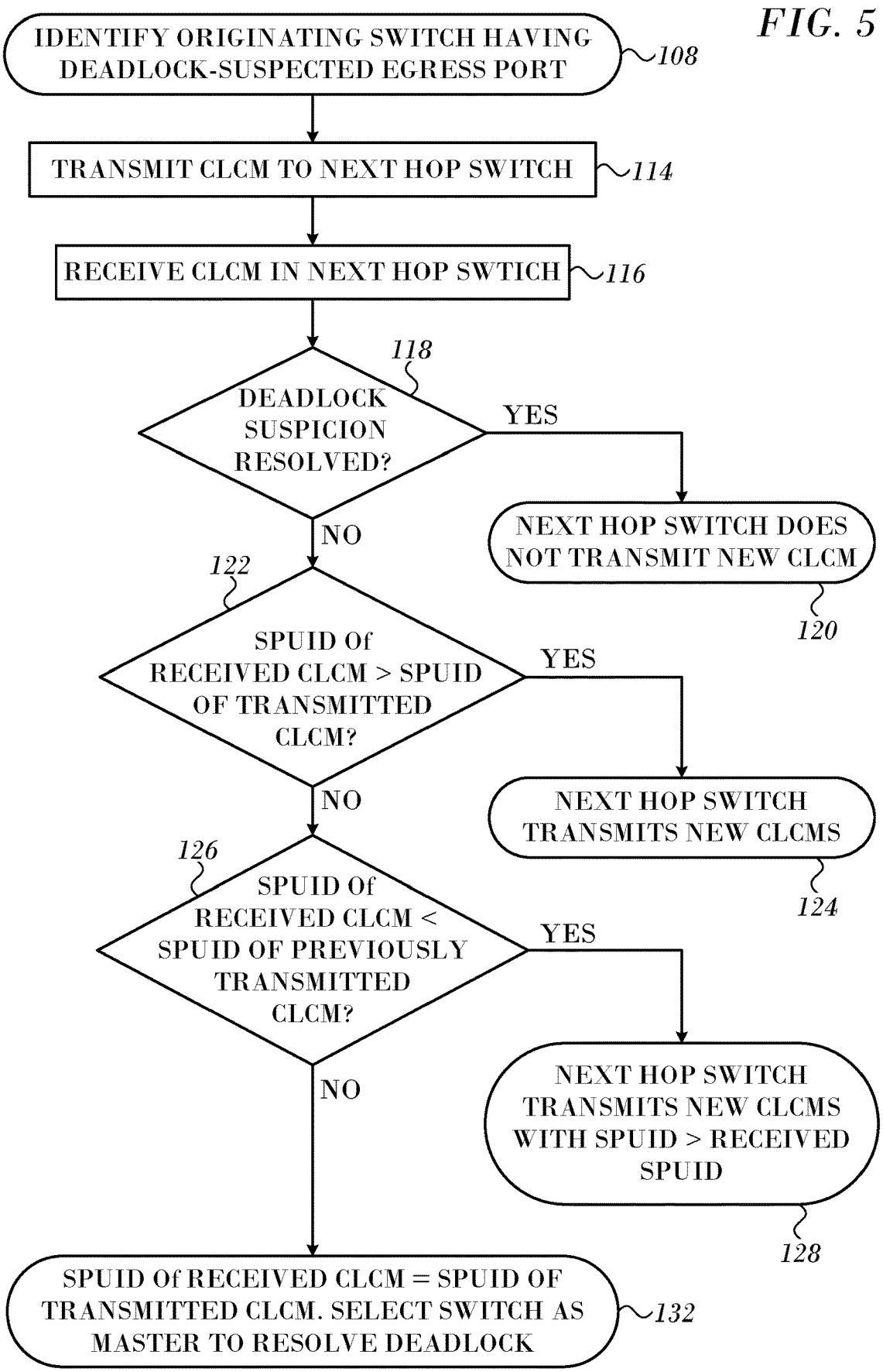
FIG. 5 is a flow chart of a method for detecting and characterizing a deadlock in a network in accordance with an embodiment of the invention.

Reference is now made to FIG. 5, which is a flow chart of a method for detecting and characterizing a deadlock in a network in accordance with an embodiment of the invention. The process steps in FIG. 5 and other flow charts herein are shown in a particular linear sequence for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 108 an egress port of a switch is determined to be deadlock-suspected based on satisfaction of the two above-noted criteria.

Figure 6:
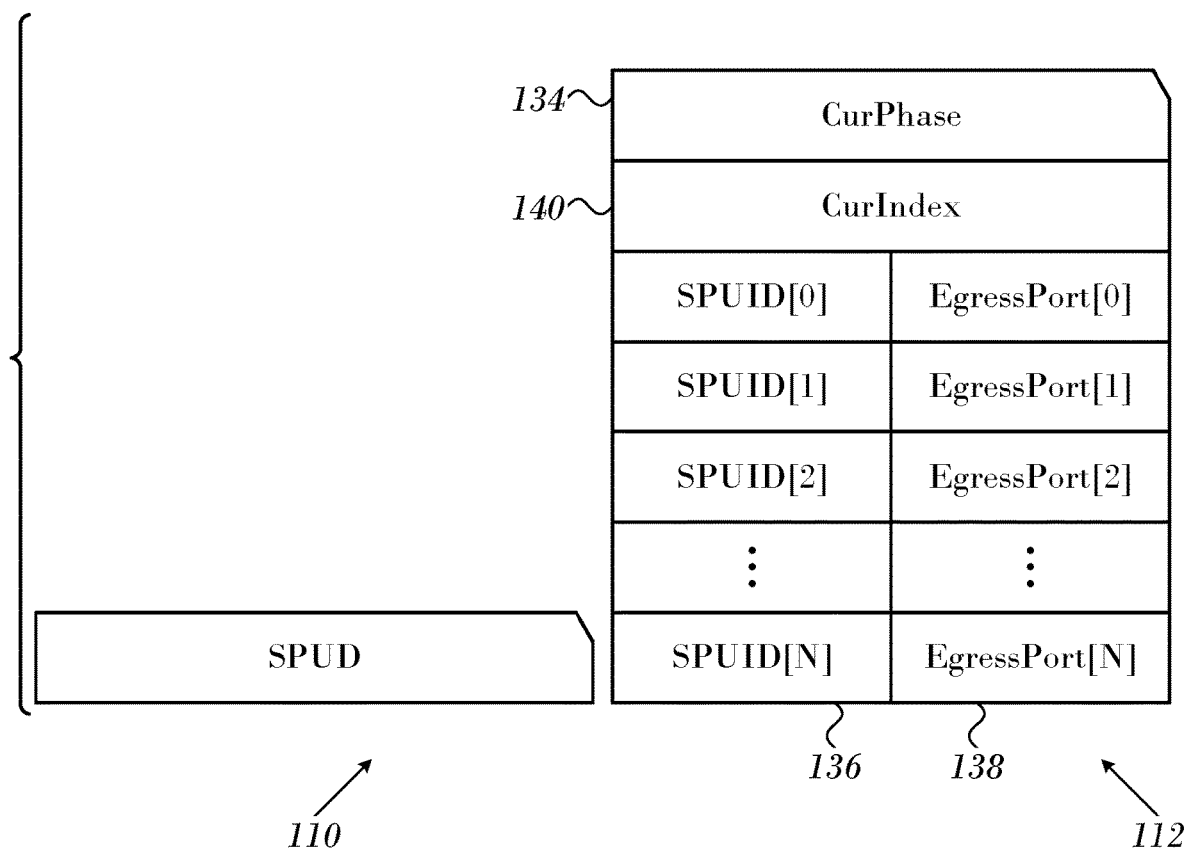
FIG. 6 is a combined chart illustrating alternate formats of a CLCM in accordance with an embodiment of the invention.

So long as a port of a switch is continues to be deadlock-suspected, the switch, referred to as an "originating switch" periodically transmits a Credit Loop Control Message (CLCM) through the deadlock-suspected port. The periodicity is a configurable static parameter. For example, it can be set according to network latencies. Reference is now made to FIG. 6, which is a combined chart illustrating alternate formats 110, 112 of a CLCM in accordance with an embodiment of the invention. Format 110 applies to the Loop Breaker algorithm. Format 112 is discussed below.

A locked credit loop spans several switches, which concurrently try to detect it by initiating the process, each such switch functioning as an originating switch in initial step 108 and transmitting a CLCM in step 114. After a credit loop is detected as described below, only one of the switches is required to resolve it (to "break" the loop). So a distributed master selection is needed.

As shown in format 110 the CLCMs carry a Switch Port-Unique identifier (SPUID). The SPUID is randomized from a large range in order to minimize the probability of identifier collision. A 32-bit SPUID is large enough to practically guarantee a unique assignment in a network comprising 10,000 64-port switches. The CLCM is sent with a special traffic priority, so that it is not blocked by flow control based on data priorities. Every participating switch tries to detect the loop with a randomized SPUID. The switch that draws the SPUID with the lowest number is chosen as master and breaks the loop.

Reverting to FIG. 5, one instance of the transmission of a CLCM from the originating switch to a next-hop switch is represented by step 114. CLCMs are one-hop control packets, i.e., a switch receiving a CLCM (referred to as the "current next-hop switch") must act on it in some manner, rather than simply forwarding the CLCM. As a minimum, the current next-hop switch checks the SPUID of the CLCM.

The current next-hop switch may respond to the CLCM by forwarding the CLCM to a subsequent next-hop switch. When this occurs a new SPUID is generated and replaces the SPUID of the received CLCM if the new SPUID is lower than the SPUID of the received CLCM. The egress port is another deadlock-suspected port. The reason for replacing the SPUID is to assure that in a credit loop, only one switch in the loop receives a CCLM having the same SPUID as the SPUID of a CLCM that exited through its egress port. That switch will resolve the loop as explained below.

Consumption of CLCMs in a next-hop switch does not depend on next-hop buffers. There is no problem of congestion or dropping of these packets, assuming that the switch CPU can handle them fast enough.

When CLCMs are received by a next-hop switch in step 116 their SPUIDs are compared to those previously sent by that switch. In normal operation a CLCM would be transmitted by a preceding hop in a routing sequence. But in a deadlock-suspected situation, this may not hold true. Indeed, a CLCM sent by a switch may return to that switch as part of a credit loop. So long as a suspicion of deadlock exists with respect to the originating switch, each next-hop switch in a sequence also sends periodic CLCMs to its successors in the sequence. Comparisons and reactions to the comparisons in the following discussion are made by each switch that receives a CLCM, although only a single instance is shown in the flow chart for simplicity of presentation:

At decision step 118 it is determined if the egress port in the current next-hop switch is no longer deadlock-suspected. If so then at final step 120 the next-hop switch does not generate a new CLCM. Rather, the next-hop switch simply ignores the received CLCM. Removal of deadlock suspicion might occur, for example, by the actions of another switch in the credit loop.

Otherwise at decision step 122, it is determined if the received SPUID is greater than any of the SPUIDs sent by the next-hop switch based on a previous iteration of step 116. If so then at final step 124 the switch ignores the received CLCM and continues to periodically originate its own CLCMs with respective new SPUIDs.

Otherwise at decision step 126 it is determined whether the received SPUID is lower than at least one of the SPUIDs sent by the switch. If so, then at final step 128 the switch replaces the SPUID of the CLCM on the egress ports with a SPUID with a greater value than the received SPUID.

Otherwise the received SPUID must be equal to the SPUID that was previously generated by the switch. In other words, the CLCM has traversed the loop and returned to the switch that previously supplied its SPUID. Such an event identifies a specific egress port in the case where several deadlock-suspected ports exist. At final step 132 The current next-hop switch is chosen as a master, i.e., as a resolving switch for the deadlock. The master stops sending CLCMs begins a process of resolving or breaking the loop as described below.

Rerouting.

The credit loop resolving switch selected in final step 132 resolves the deadlock by rerouting flows. The rerouted flows are the flows that arrive and are forwarded on the credit loop ingress and egress ports. Several methods can be used to identify the flows that are forwarded on specific ports. One method is to continuously monitor the recent flows and keep a database of recent pairs of ingress and egress ports.

We assume that all the flows that are required to be rerouted have an alternative path to the destination. For each of the flows another min-distance port is chosen according to some metric, e.g., a port that satisfies an ECMP requirement. However, in some topologies, specific ports on some switches do not have parallel routes to a destination. For example, in fat-trees, that there is often a single path to the destination for traffic flowing through any switch down towards the leaves. Hence, for some switches on such topologies the credit loop would not be resolved if those switches were chosen as a resolving (master) switch.

One solution to this situation is to refuse to initiate CLCM transmissions by switches through which no alternate path to the destination exists. Instead, when a CLCM is received, it is simply forwarded to the next switch. As a result, the forwarding switch will not be selected as a resolving switch for the credit loop. The loop will be resolved by another switch that does enjoy alternative paths to the destination.

Alternatively one may select a resolving switch to reroute flows that are not part of the credit loop, but reach the blocked port at the resolving switch via some other port, and then enter the credit loop. Rerouting such flows will further reduce the offered load on the blocked port on the loop, decrease the headroom buffer occupancy below the pause threshold, and help free the deadlock.

Traffic Release.

In common switch hardware architectures, packets that finished processing and are enqueued in an egress queue cannot be re-queued to another egress queue. Therefore, changing the routing rules is not sufficient to resolve the credit loop, since the ports on the credit loop are stalled and traffic cannot flow. Therefore, an additional step is required to release the traffic.

After changing the routing rules, we require the resolving switch to force transmission of additional traffic from the deadlock-suspected (now deadlock-proven) port on the credit loop, even though the port is currently blocked from transmission by the flow control and the additional packets may be dropped by the next switch. The flow control is overridden. The additional transmitted packets release space on the switch buffer, and allows the ingress ports of the switch to be released from the flow control block. The incoming traffic thereby releases buffer space in the previous switch on the loop, and so on. Eventually, the credit loop is resolved.

It is tricky to determine how much traffic the resolving switch should initially release. On one hand, the released traffic during flow control blocking might be dropped by the next switch due to lack of sufficient buffer space. But on the other hand, at least one packet of traffic must be released to remove the deadlock. In a current implementation, the traffic is released gradually, the rate of release being determined empirically.

Deadlock Breaker.

This section describes an extension to the CLCM protocol that traverses discovered loops to allocate buffers and thereby avoid packet drop. Credit loop deadlocks are considered harmful mostly because they require packet drop to recover. An algorithm described herein, referred to as "Deadlock Breaker" algorithm, guarantees forward progress on the credit loop, even after deadlock occurs, without trying to break the loop. It assumes that loop will be broken by itself when the traffic pattern will be changed. The algorithm releases the deadlock without loss of packets and without any change to routing. It is combined from following steps: (1) deadlock detection and (2) deadlock release.

Similarly to the Loop Breaker algorithm, in a first phase the Deadlock Breaker algorithm uses CLCM packets that are sent periodically through the output ports of switches that are marked as deadlock-suspected for deadlock detection. As in the Loop Breaker algorithm a master switch is selected to resolve the deadlock. However, the Deadlock Breaker algorithm adds a second phase, referred to as a "release phase".

Referring again to FIG. 6, format 112 applies to the Deadlock Breaker algorithm. During the release phase of the Deadlock Breaker algorithm, a CLCM packet needs to again traverse the detected loop to signal a need for additional buffers. To enable a second traversal of the same loop as that identified in the detection phase (FIG. 5), four fields were added to the CLCM in format 112: a current phase field 134 (CurPhase), an SPUID array 136 (SPUID[ ]), an egress port array 138 (EgressPort[ ]) and a current index field 140 (CurIndex) into the arrays 136, 138. When a new CLCM is created its current phase field 134 is set to "detection" and its current index field 140 is set to zero.

Figure 7:
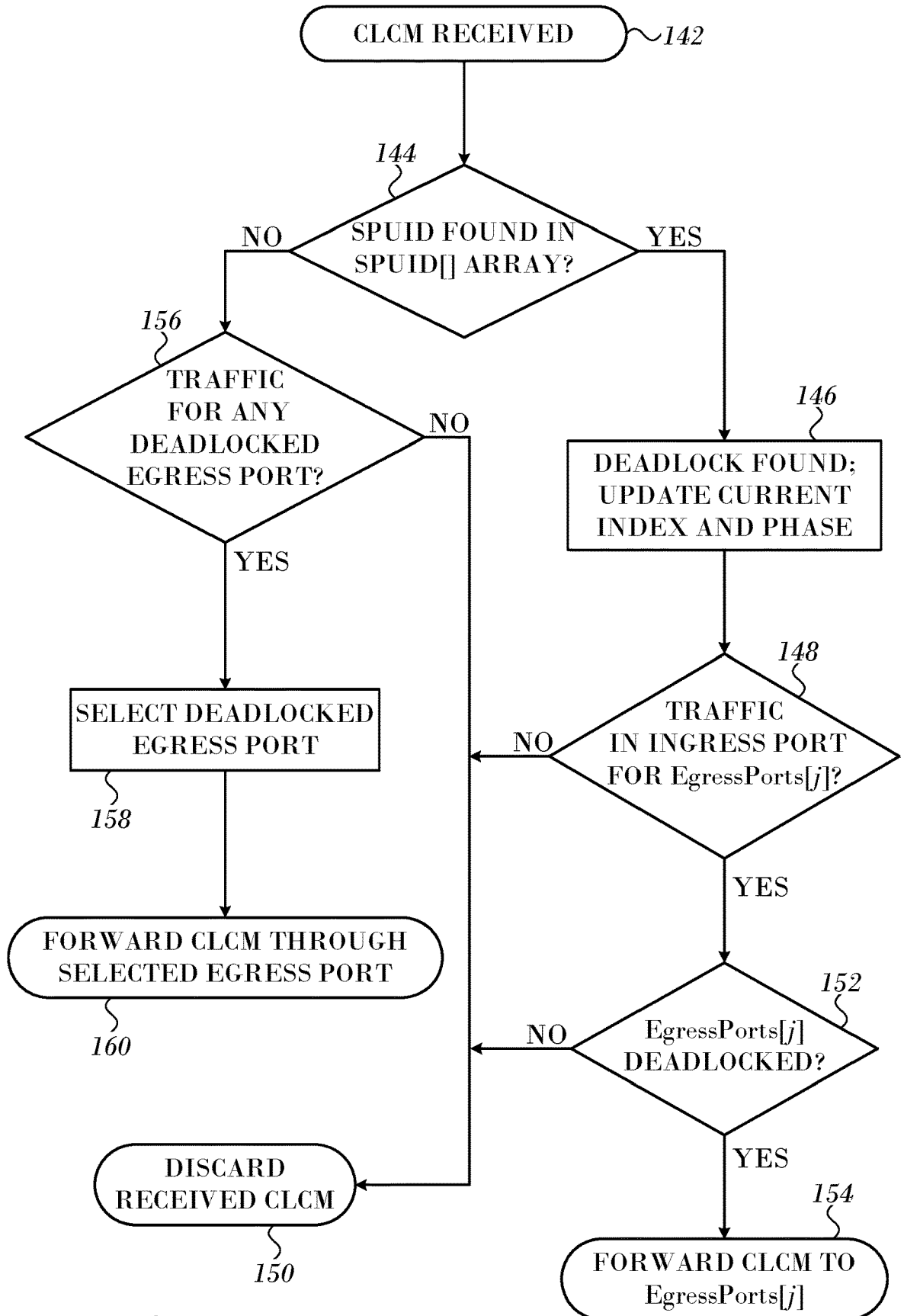
FIG. 7 is a flow chart of a process performed during the detection phase of the Deadlock Breaker algorithm in accordance with an embodiment of the invention.

Reference is now made to FIG. 7, which is a flow chart of a process performed during the detection phase of the Deadlock Breaker algorithm in accordance with an embodiment of the invention. At initial step 142 a CLCM is received by a switch. The SPUID array 136 of the CLCM is updated by addition of a new entry by every switch that handles the CLCM. The new entry comprises the SPUID of the switch and the egress port followed by the CLCM.

Next, at decision step 144, it is determined if the SPUID of the received CLCM is identical to the SPUID of a CLCM previously transmitted by the receiving switch, i.e., whether the CLCM has traversed the credit loop and returned to the current switch. The determination is accomplished by searching the SPUID array 136 (FIG. 6) to see if its own SPUID is already there. If the determination at decision step 144 is negative, then control proceeds to decision step 156, which is described below.

If the determination at decision step 144 is affirmative then a deadlock has been found at an index value j of the SPUID array 136. When this happens, then at step 146 the value of the current phase field 134 of the CLCM changes to "release" and the index j is written into the current index field 140 of the received CLCM.

Next, at decision step 148, it is determined if an ingress port of the switch has traffic for the egress port referenced by the field EgressPorts[j] in the egress port array 138. If the determination at decision step 148 is negative, then the received CLCM is discarded at final step 150.

If the determination at decision step 148 is affirmative, then control proceeds to decision step 152, where it is determined if the egress port referenced by the field Egress-Ports[j] in the egress port array 138 is deadlocked. If the determination at decision step 152 is negative, then control proceeds to final step 150 and the CLCM is discarded.

If the determination at decision step 152 is affirmative, then control proceeds to final step 154. The received CCLM is forwarded to the egress port referenced by the field EgressPorts[j] in the egress port array 138.

If the determination at decision step 144 is negative, i.e., the SPUID of the received CLCM is not found in the SPUID array 136 (FIG. 6) in the record of the switch then at decision step 156 it is determined if the ingress port receiving the CLCM has traffic directed through any egress port of the switch that is deadlock-suspected. If the determination at decision step 156 is negative, then control proceeds to final step 150 and the CCLM is discarded.

If the determination at decision step 156 is affirmative, then control proceeds to step 158 one of the deadlocked egress ports identified in decision step 156 is selected. The selection may be random but not necessarily so. The current SPUID and selected egress port of the switch are stored in the SPUID array 136 and egress port array 138, respectively. The index in the current index field 140 is incremented and its phase changed to "release".

Then at final step 160 the CCLM is forwarded through the egress port that was selected in step 158.

Figure 8:
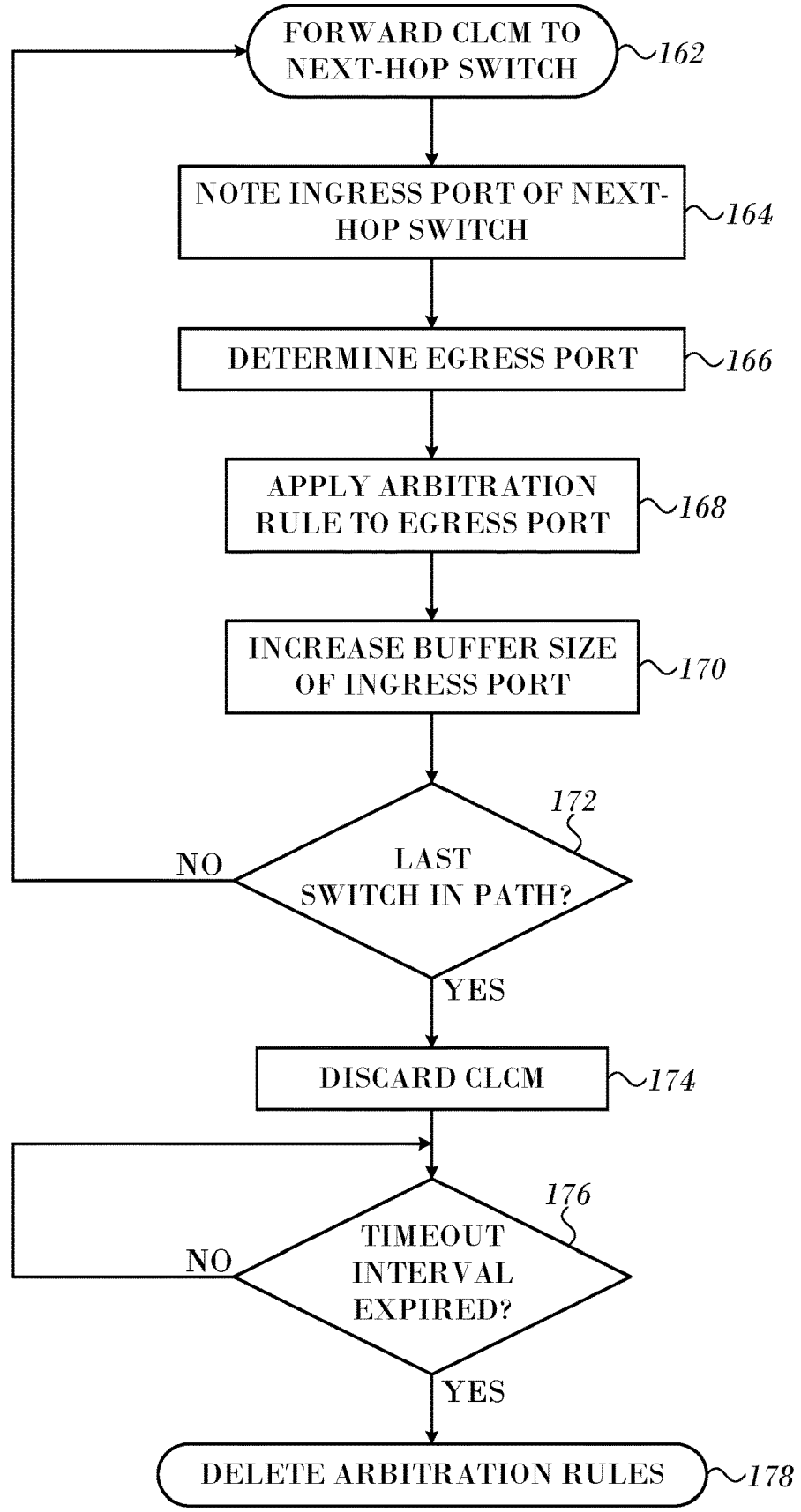
FIG. 8 is a flow chart of a process performed during the release phase of the Deadlock Breaker algorithm in accordance with an embodiment of the invention.

Reference is now made to FIG. 8, which is a flow chart of a process performed during the release phase of the Deadlock Breaker algorithm in accordance with an embodiment of the invention. After completing final step 160 (FIG. 7), initial step 162 begins a phase in which the CLCM is sent along the path defined by the series of ports in the egress port array 138 (FIG. 6), beginning from the port referenced by the current index field 140. The value of the current index field 140 is increased at every hop. When a CLCM with a phase set to release is received by a switch in the path, at step 164 the switch notes the ingress port through which the CLCM was received, and is able to determine the egress port in step 166 by inspecting the content of the egress port array 138 indexed by the current index field 140 (EgressPorts [CurIndex]). The receiving switch then performs two changes to its operation that are active for a configurable time period:

First, at step 168 the receiving switch installs an arbitration rule on the egress port that only allows traffic that arrives from that ingress port to be transmitted, so no external traffic can enter the credit loop. Second, at step 170 it increases the available buffer size for the ingress port by at least a full MTU packet size, so traffic from the loop can make progress. A buffer of at least one MTU on the next switch becomes available since step 170, is performed at every hop in the path, assuring that packets are not dropped.

Next, at decision step 172, it is determined if the current switch is the last switch in the path defined by the series of ports in the egress port array 138 (FIG. 6). If the determination at decision step 172 is negative, then control returns to initial step 162 to begin another iteration.

If the determination at decision step 172 is affirmative, then control proceeds to step 174, where the CLCM is discarded.

Next, at delay step 176 expiration of a timeout interval is awaited. When this occurs control proceeds to final step 178, where the arbitration rules imposed in iterations of step 168 are deleted. It is now possible for traffic to enter the loop once again. The algorithm of FIG. 8 does not remove the credit loop. Thus, it may deadlock again. Nevertheless, when the algorithm is performed, progress in traffic movement occurs, and no packets are dropped. Congestion control mechanisms, which are outside the scope of this disclosure, may sense the relatively slow progress and compensate by lowering the bandwidth of the participating flows.

The following examples present a simple scenario in which credit loop deadlock occurs and is resolved according to embodiments of the invention.

EXAMPLE 1. LOOP BREAKER ALGORITHM

The Loop Breaker algorithm algorithms was implemented and evaluated using a Soft-ware Development Kit (SDK) of the Mellanox Spectrum™ Ethernet switch. The SDK allows access to egress queue length and the outgoing bandwidth samples. These values are monitored to determine if the egress port is suspected to be blocked.

In parallel, a flow monitoring process stores the ingress and egress ports for recent flows that are transmitted through the switch. Each flow is identified by a 5-tuple (source, destination IP addresses, source and destination layer ports and layer 4 protocol), which fields that are used by the ECMP hashing function. A preferable alternative implementation is to rely on an elephant flows detection mechanism if it is available in the switch hardware.

As described above, when a new deadlock-suspected port is detected, a new CLCM packet with a random SPUID is created and sent by the switch CPU. The switch is also configured to trap incoming CLCM packets, which are processed as described above.

Re-routing flows for breaking a credit loop is implemented by adding a specific rule for each flow that was monitored with the pairs of ingress and egress ports on the credit loop. The new rule for a flow excludes the deadlocked egress port from the ECMP group port list.

An alternative method to implement flow re-routing relies on fine-grain ECMP re-balancing feature, which was available on the Mellanox Spectrum™ switch used in this example. The switch hardware implements an ECMP table of 4K entries that is attached to the routing entry in the forwarding database. Each one of the entries defines a specific egress port. For a given flow the routing entry is defined by the destination IP address in the packet. The header fields of the packet are mapped to one of the 4K entries using a known hash function. In our implementation of the algorithm, we looked for an ECMP entry of each of the monitored flows on the credit loop and specifically changed the egress port to a randomly selected port in the ECMP group.

Releasing the traffic on the blocked port is done by temporarily disabling flow control on a port. We use two consecutive SDK API calls to disable and then to re-enable the flow control.

Figure 9:
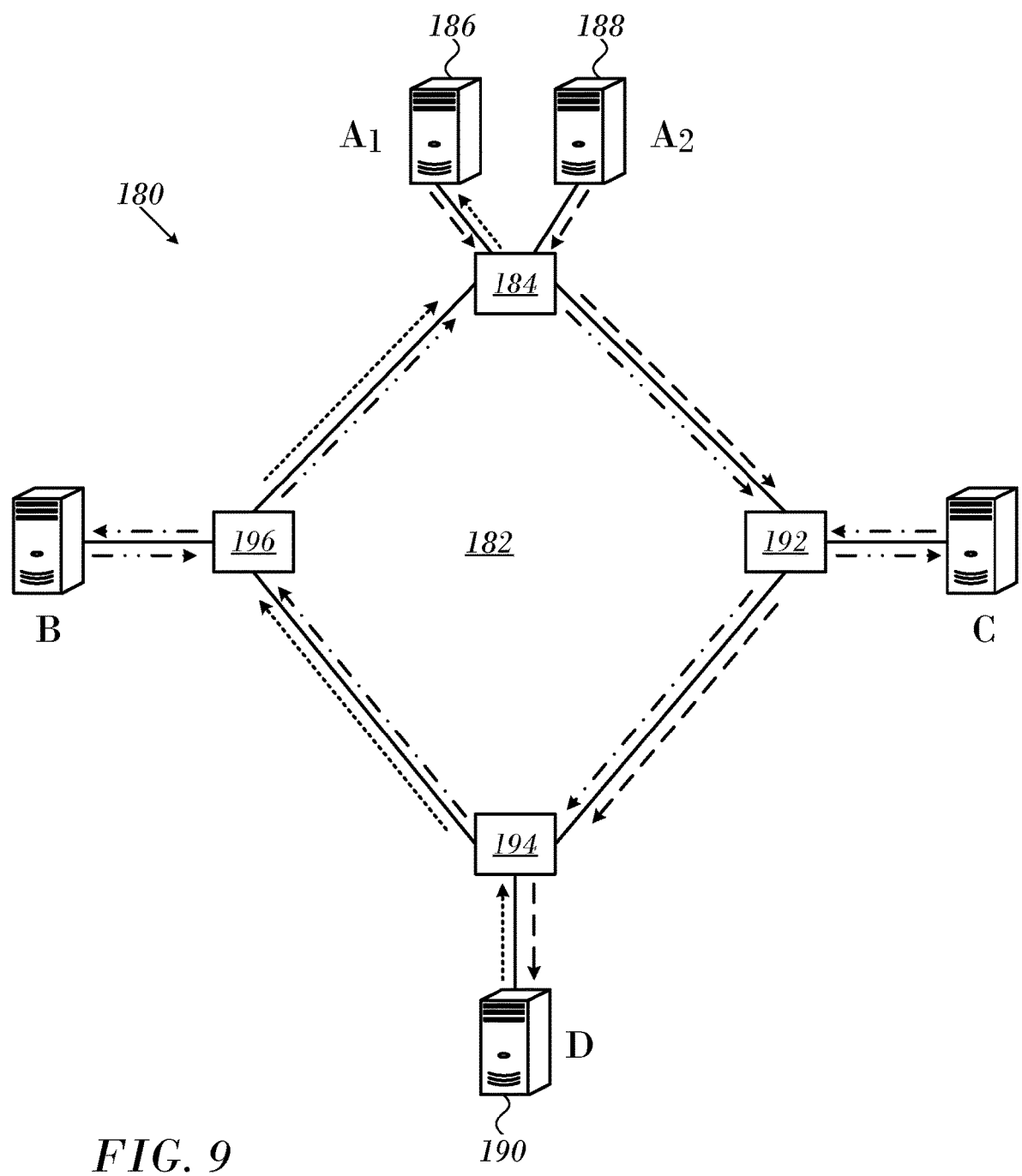
FIG. 9 is a diagram of a 2-level fat-tree having a scenario in which the Loop Breaker algorithm was simulated in accordance with an embodiment of the invention.

Reference is now made to FIG. 9, which is a diagram of a 2-level fat-tree having a scenario in which the Loop Breaker algorithm was simulated in accordance with an embodiment of the invention. Network 180 is a simplified version of the network 52 (FIG. 3), having a 2-level fat tree topology and forming a ring 182. Switch 184 is connected to two hosts 186, 188 that are injecting traffic. Each of the hosts 186, 188 sends a persistent uncongested controlled flow to a host 190 on the opposite side of the network 180, such that a flow is traversed over three switches 184, 192, 194 on its minimal distance route. All the traffic on the ring 182 is routed in the same direction (clockwise, in this example). The additional host on the switch 184 is required to break the symmetry of the scenario. Without it, the buffers would not be filled up, since in every switch there would be two incoming full rate ports, which would be forwarded to two other distinct ports. The addition of an incoming port to one of the switches, allows it to become congested, since now there are three incoming full rate ports that are forwarded to two egress ports only. The congestion spreads to a previous switch 196 on the ring 182, and then to all the switches on the ring 182.

This scenario shown in FIG. 9 was simulated, and indeed the credit loop deadlock was resolved by the new mechanism. The measured bandwidth dropped to zero without performing the Loop Breaker algorithm, and recovered once the algorithm was run. In order to provide finer grain waveforms. The scenario was simulated using the OMNeT++ simulation package.

Figure 10:
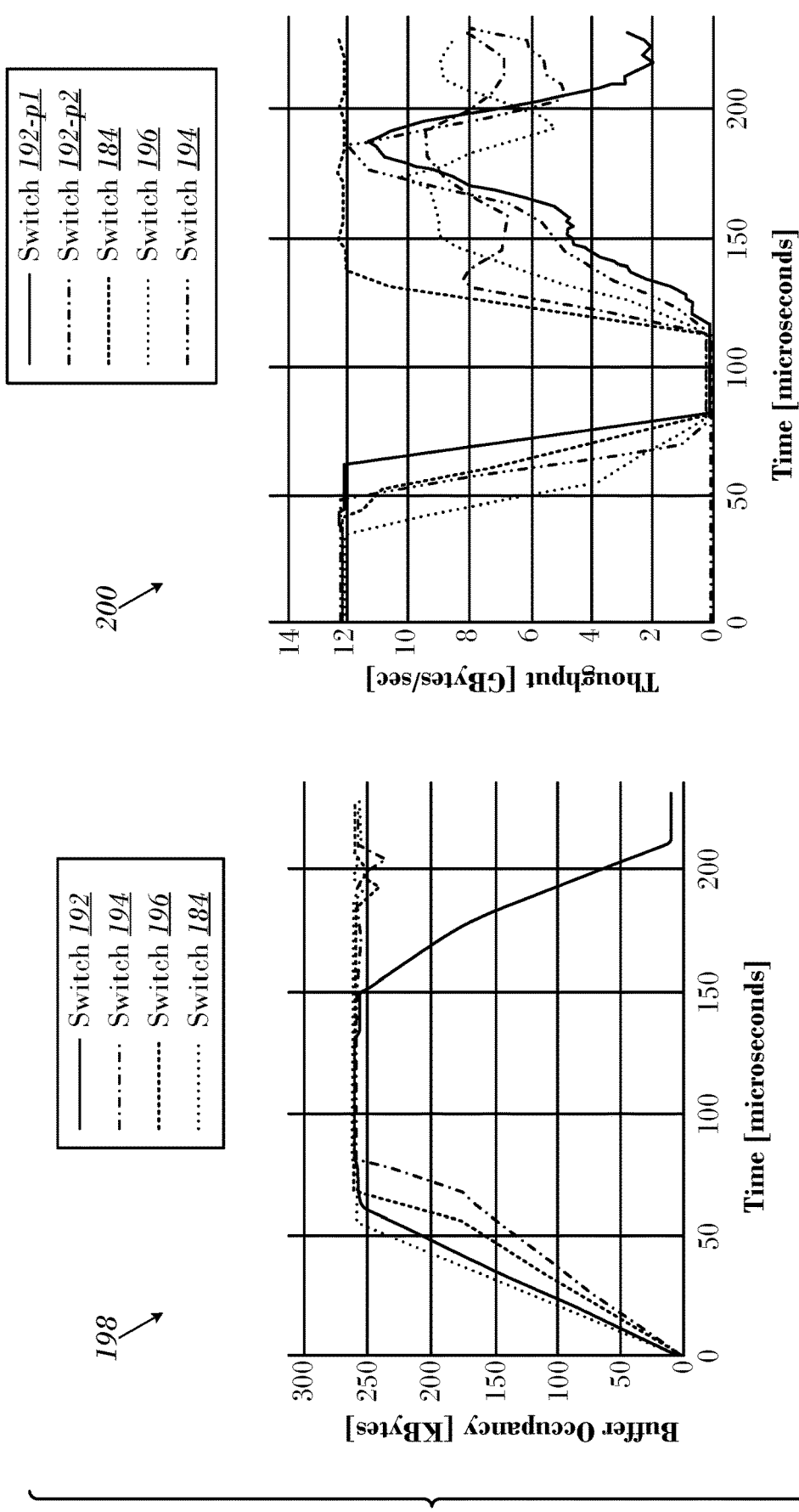
FIG. 10 is a set of graphical plots of a simulation of the scenario shown in FIG. 9 in accordance with an embodiment of the invention.

Reference is now made to FIG. 10, which is a set of graphical plots of the simulation of the scenario of FIG. 9 in accordance with an embodiment of the invention. Plots 198, 200 show the buffer occupancy of the switches 184, 190, 192, 196 and the throughput of ports on the ring 182 over time, respectively. At time 80 sec the loop locks and the algorithm starts to operate on a switch that was chosen as a master, and the new incoming data of flows is rerouted to another link. Switch 192 was selected as the master and reroutes the flows between the ports beginning at time 120 sec. The credit loop is broken and traffic released from a deadlock. Beginning at time 150 sec the buffer occupancy of switch 192 decreases, since now it has two outgoing links. The time span between occurrence of the deadlock and its resolution depends on the propagation times of the links on the ring and on the processing latency of CLCMs in the switch CPUs.

EXAMPLE 2. DEADLOCK BREAKER

Figure 11:
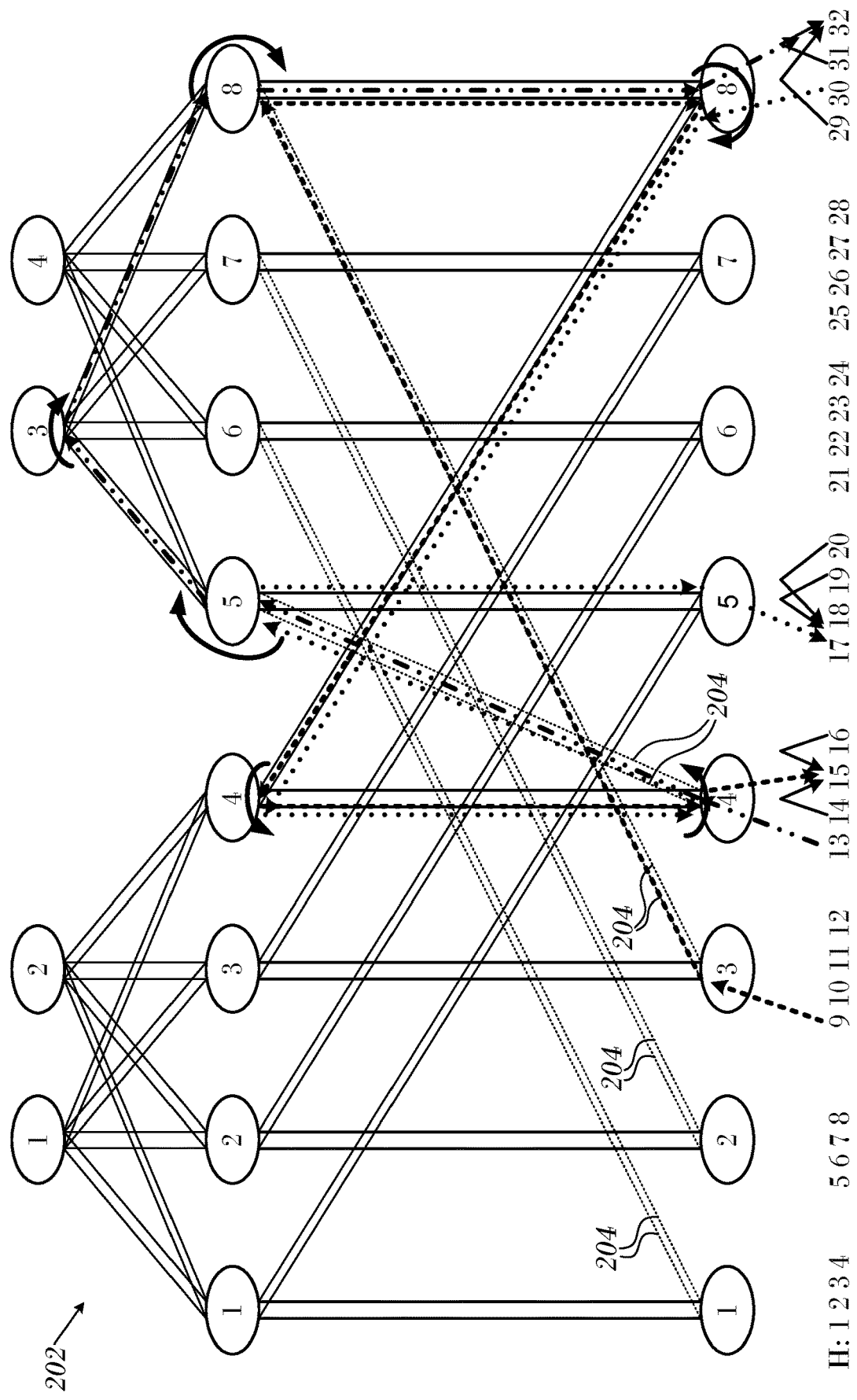
FIG. 11 is a diagram of a 3-level fat-tree in which the Deadlock Breaker algorithm was simulated in accordance with an embodiment of the invention.

Reference is now made to FIG. 11, which is a diagram of a 3-level fat-tree 202 in which the Deadlock Breaker algorithm was simulated in accordance with an embodiment of the invention. In this Example, the Deadlock Breaker algorithm was implemented in a network simulator and tested on the network presented in FIG. 11. Wiring mistakes, indicated by dashed lines 204, makes this fat-tree prone to credit loops, even when routed with a minimal hop routing algorithm. To cause a deadlock we introduced nine flows: flows 9 ! 15; 13 ! 32; 30 ! 17 form the credit loop; and flows 14 ! 15; 16 ! 15; 18 ! 17; 20 ! 17; 29 ! 32; 31 ! 32 create the backpressure required to fill up the buffers of switches participating in the credit loop. We simulated the network with and without the Deadlock Breaker algorithm and measured the output bandwidth of the flows on the credit loop.

Figure 12:
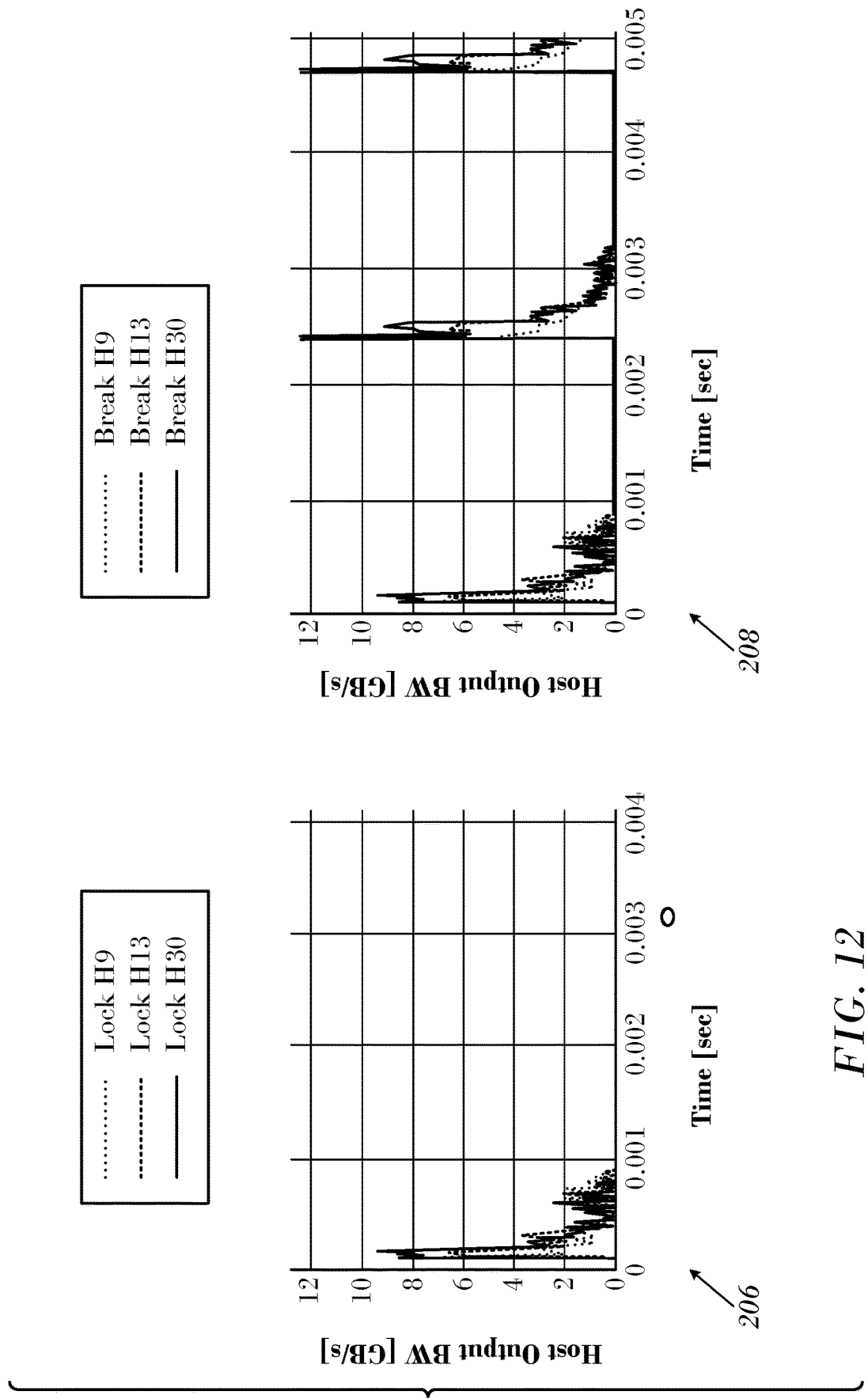
FIG. 12 is a set of graphical plots of a simulation of the scenario shown in FIG. 11 in accordance with an embodiment of the invention.

Reference is now made to FIG. 12, which is a set of graphical plots of a simulation of the scenario shown in FIG. 11 in accordance with an embodiment of the invention. As presented in plot 206 the bandwidth of the flows on the loop drops fast and stay at zero since the loop deadlocks. By enabling the Deadlock Breaker algorithm the credit loop flows make temporary progress as shown in plot 208.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication, comprising the steps of:
in a packet network of switches, the switches having ingress ports, egress ports and switch buffers, at least a portion of the switches being interlinked in a credit loop comprising loop-participating switches;
making a determination that at least a portion of the loop-participating switches are deadlock-suspected switches based, respectively, on an existence in a deadlock-suspected egress port thereof of a non-zero queue length for a predetermined time interval and an absence of throughput for the predetermined time interval;
responsively to the determination performing first traversals of the credit loop by periodically transmitting respective credit loop control messages (CLCMs) from the deadlock-suspected switches via the deadlock-suspected egress port to respective next-hop loop-participating switches of the credit loop, the CLCMs each having a switch port-unique identifier (SPUID);
in deadlock-suspected next-hop loop-participating switches forwarding the CLCMs to subsequent next-hop loop-participating switches via the deadlock-suspected egress port thereof;
establishing that a deadlock exists in the credit loop by determining that all the switch buffers in links to the loop-participating switches are full, and that no packets are propagating through the links;
thereafter selecting a master switch from the loop-participating switches, wherein the SPUID of a received CLCM equals the SPUID of a previously transmitted CLCM; and
in a release phase of operation resolving the deadlock in the credit loop with the master switch by:
transmitting new CLCMs to perform second traversals of the credit loop along a path that extends through a selected deadlocked egress port of each of the loop-participating switches, the second traversals comprising:
(a) recording in the new CLCMs the SPUID and the selected deadlocked egress port of respective loop-participating switches in the path; and:
(b) in respective loop-participating switches identifying the ingress port using the recording in the new CLCMs; and
(c) performing by the respective loop-participating switches a reconfiguration thereof for a predefined time interval to affect packet traffic that flows via the identified ingress port through the selected deadlocked egress port thereof.

2. The method according to claim 1, further comprising:
determining that that the SPUID of a currently received CLCM exceeds the SPUID of the previously transmitted CLCM; and
thereafter continuing to periodically transmit CLCMs.

3. The method according to claim 1, further comprising:
determining that that the SPUID of a currently received CLCM exceeds the SPUID of the previously transmitted CLCM; and
thereafter transmitting another new CLCM having the SPUID of the currently received CLCM.

4. The method according to claim 1, wherein in the reconfiguration the selected deadlocked egress port accepts therethrough only packets that pass through the identified ingress port.

5. The method according to claim 1, wherein resolving the deadlock comprises the steps of:
identifying flows of packets that traverse pairs of ingress ports and deadlock-suspected egress ports in the master switch; and
rerouting the identified flows via respective alternate paths to destinations thereof, the alternate paths having minimum cost metrics.

6. The method according to claim 5, wherein rerouting the identified flows comprises changing routing rules in the loop-participating switches.

7. The method according to claim 1, wherein the reconfiguration comprises the step of releasing a buffer space on the master switch by forcing transmission of packets via the selected deadlocked egress port of the master switch.

8. The method according to claim 7, wherein forcing transmission is performed by overriding a credit flow control.

9. The method according to claim 1, wherein the reconfiguration comprises increasing an available buffer size in the identified ingress port.

10. The method according to claim 1, wherein the new CLCMs contain switch data that identify each of the loop-participating switches that is traversed.

11. A system, comprising:
a packet network; and
a plurality of switches in the network, the switches having ingress ports, egress ports and switch buffers, at least a portion of the switches being interlinked in a credit loop in the network, the credit loop comprising loop-participating switches that are configured to cooperatively perform the steps of:
making a determination that at least a portion of the loop-participating switches are deadlock-suspected switches based, respectively, on an existence in a deadlock-suspected egress port thereof of a non-zero queue length for a predetermined time interval and an absence of throughput for the predetermined time interval;
responsively to the determination performing first traversals of the credit loop by periodically transmitting respective credit loop control messages (CLCMs) from the deadlock-suspected switches via the deadlock-suspected egress port to respective next-hop loop-participating switches of the credit loop, the CLCMs each having a switch port-unique identifier (SPUID);
in deadlock-suspected next-hop loop-participating switches forwarding the CLCMs to subsequent next-hop loop-participating switches via the deadlock-suspected egress port thereof;
establishing that a deadlock exists in the credit loop by determining that all the switch buffers in links to the loop-participating switches are full, and that no packets are propagating through the links;
thereafter selecting a master switch from the loop-participating switches, wherein the SPUID of a received CLCM equals the SPUID of a previously transmitted CLCM; and
in a release phase of operation resolving the deadlock in the credit loop with the master switch, by:
transmitting new CLCMs to perform second traversals of the credit loop along a path that extends through a selected deadlocked egress port of each of the loop-participating switches, the second traversals comprising:
(a) recording in the new CLCMs the SPUID and the selected deadlocked egress port of respective loop-participating switches in the path; and
(b) in respective loop-participating switches identifying the ingress port using the recording in the new CLCMs; and
(c) performing by the respective loop-participating switches a reconfiguration thereof for a predefined time interval to affect packet traffic that flows via the identified ingress port through the selected deadlocked egress port thereof.

12. The system according to claim 11, wherein the switches are further configured for performing the steps of:
determining that that the SPUID of a currently received CLCM exceeds the SPUID of the previously transmitted CLCM; and
thereafter continuing to periodically transmit CLCMs.

13. The system according to claim 11, wherein the switches are further configured for performing the steps of:
determining that that the SPUID of a currently received CLCM exceeds the SPUID of the previously transmitted CLCM; and
thereafter transmitting another new CLCM having the SPUID of the currently received CLCM.

14. The system according to claim 11, wherein in the reconfiguration the selected deadlocked egress port accepts therethrough only packets that pass through the identified ingress port.

15. The system according to claim 11, wherein the switches are further configured for resolving the deadlock by performing the steps of:
identifying flows of packets that traverse pairs of ingress ports and the deadlock-suspected egress port in the master switch; and
rerouting the identified flows via respective alternate paths to destinations thereof, the alternate paths having minimum cost metrics.

16. The system according to claim 15, wherein the switches are further configured for resolving a deadlock by releasing a buffer space on the master switch by forcing transmission of packets via the deadlock-suspected egress port of the master switch.

17. The system according to claim 16, wherein forcing transmission is performed by overriding a credit flow control.

18. The system according to claim 11, wherein the switches are further configured for increasing an available buffer size in the identified ingress port.

19. A method of communication, comprising the steps of:
in a network of switches that are interconnected for packet traffic flows therethrough, the switches being interlinked in a credit loop comprising loop-participating switches:
making a determination that at least a portion of the loop-participating switches are deadlock-suspected switches based, respectively, on an existence in a deadlock-suspected egress port thereof of a non-zero queue length for a predetermined time interval and an absence of throughput for the predetermined time interval;

responsively to the determination periodically transmitting respective credit loop control messages (CLCMs) from the deadlock-suspected switches via the deadlock-suspected egress port to respective next-hop loop-participating switches of the credit loop, the CLCMs each having a switch port-unique identifier (SPUID);

in deadlock-suspected next-hop loop-participating switches forwarding the CLCMs to subsequent next-hop loop-participating switches via the deadlock-suspected egress port thereof;

selecting a master switch from the loop-participating switches, wherein the SPUID of a received CLCM equals the SPUID of a previously transmitted CLCM;

determining that ports of the loop-participating switches are stalled; and thereafter resolving a deadlock in the credit loop with the master switch, wherein resolving a deadlock comprises the steps of:

after selecting a master switch repeating the step of periodically transmitting respective CLCMs through the credit loop, using new CLCMs as the CLCMs;

determining in one of the loop-participating switches that the SPUID of a current new CLCM matches the SPUID of a previously received new CLCM and that the deadlock-suspected egress port thereof is deadlocked;

in a release phase of operation retransmitting the current new CLCM via the deadlock-suspected egress port through the loop-participating switches of the credit loop; and in the loop-participating switches performing the steps of:
respectively identifying an ingress port and a previously traversed egress port of the current new CLCM; and
permitting only packets from the identified ingress port to be transmitted through the previously traversed egress port, wherein the CLCMs further comprise:

phase data that identify the release phase of operation; and a SPUID array identifying the SPUID of each of the loop-participating switches that is traversed in the release phase of operation;

an egress port array identifying the egress port of each of the loop-participating switches that is traversed in the release phase of operation; and an index into the SPUID array and the egress port array, wherein identifying an ingress port and a previously traversed egress port are performed by updating the SPUID array, the egress port array and the index when the loop-participating switches are traversed in the release phase of operation.

* * * * *